United States Patent [19]

Wilson et al.

[11] Patent Number: 5,009,685

[45] Date of Patent: Apr. 23, 1991

[54] SYSTEM FOR IMPROVING THE WORK ENVIRONMENT IN A CONTAMINATED ROOM

[76] Inventors: Cary L. Wilson, 5408 E. 11th St., Ste. B, Tulsa, Okla. 74112; John A. Graham, 4606 E. 67th St., Ste. 403-7, Tulsa, Okla. 74136

[21] Appl. No.: 480,275

[22] Filed: Feb. 15, 1990

[51] Int. Cl.[5] ............................................. B01D 46/42

[52] U.S. Cl. ..................................... 55/385.2; 55/467; 98/33.1; 98/34.5; 98/36; 98/42.02

[58] Field of Search ..................... 55/97, 385.1, 385.2, 55/467; 49/68; 52/79.1, 79.5, 79.9; 98/1.5, 31.5, 33.1, 34.5, 36, 115.3, 115.4, 42.02; 135/97, 101, 900; 312/1, 3

[56] References Cited

U.S. PATENT DOCUMENTS 4,604,111 8/1986 Natale ................................ 55/385.2
4,801,312 1/1989 Mateson .................................. 55/97
4,905,578 3/1990 Curtis et al. .......................... 98/1.5

OTHER PUBLICATIONS

U.S. Statutory Invention Registration, Reg. No. H460, published Apr. 5, 1988, filed Sep. 24, 1987.

*Primary Examiner*—Jay H. Woo
*Assistant Examiner*—James P. Mackey
*Attorney, Agent, or Firm*—Head & Johnson

[57] ABSTRACT

A system for improving the work environment in a contaminated room while contaminated material, such as asbestos, is being removing therefrom, including a dressing room adjacent the contaminated room, a decontamination unit connecting the dressing room with the contaminated room through which workmen pass when entering or exiting the contaminated room, a filtered air pump for passing filtered air from within the contaminated room through an air discharge opening to the atmosphere to maintain negative air pressure within the contaminated room, a conduit connecting the contaminated room with the decontamination unit, and a filtered air pump for passing filtered air through the conduit into the decontamination unit to maintain positive air pressure within the decontamination unit and air flow therein from the decontamination unit into the contaminated room.

5 Claims, 2 Drawing Sheets

SYSTEM FOR IMPROVING THE WORK ENVIRONMENT IN A CONTAMINATED ROOM

SUMMARY OF THE INVENTION

In recent years, the danger of exposure to asbestos fibers has been brought to the public's attention. In the past, asbestos was commonly employed alone or in combination with other materials for insulation in buildings. In addition, asbestos has been frequently employed for insulating pipes and conduits, particularly where steam heat or centralized heating and cooling has been employed.

Since the presence of asbestos within buildings constitutes a health hazard, programs have been underway for removing it from buildings.

One problem encountered in the process of removing asbestos, or any similar type of contamination, is that of preventing the asbestos fibers from escaping and passing into the environment during the removal process. Others have attacked the problem of preventing the passage of asbestos fibers from the interior of a building being decontaminated into the atmosphere, and for reference to background material on this subject, U.S. Pat. Nos. 4,604,111 and 4,801,312 are helpful. Each of these prior issued U.S. Pats. are incorporated herein by reference.

The present disclosure is to a system for improving the work environment in a contaminated room while contaminated material, such as asbestos, is being removed therefrom. The contaminated room has a door through which workmen can enter or exit. In addition, the contaminated room is provided with a first and a second air discharge opening.

A dressing room is established adjacent the contaminated room providing an area in which workmen can prepare for work or prepare for leaving work after working in a contaminated room. The dressing room may be such as a portable building temporarily located adjacent a room to be decontaminated.

A decontamination unit connects the dressing room with the contaminated room and provides a passageway through which workmen pass when entering or exiting the contaminated room.

At least one filtered air pump is provided for passing filtered air from within the contaminated room through the first air discharge opening therein to move air from the interior to the exterior of the room, that is, to the atmosphere. The filtered air pump maintains negative air pressure within the contaminated room at all times while workmen are in the room and contaminated material is being removed. A conduit connects the second air discharge opening of the contaminated room with the decontamination unit.

A filtered air pump is connected to the conduit and passes filtered air from the interior of the contaminated room through the conduit and into the decontamination unit to maintain positive air pressure within the decontamination unit. As a result of this positive air pressure in the decontamination unit and the negative air pressure in the contaminated room, air flow is maintained unidirectionally from the decontamination unit into the contaminated room. A door is provided between the decontamination unit and the dressing room.

In a preferred embodiment, at least one filtered air pump is established within the contaminated room for filtering and circulating air within the room. In addition, the decontamination unit preferably includes a shower facility therein through which workmen pass when entering or exiting the contaminated room.

A better understanding of the invention will be had by reference to the following description and claims, taken in conjunction with the attached drawings.

DESCRIPTION OF THE PREFERRED EMBODIMENT

Figure 1:
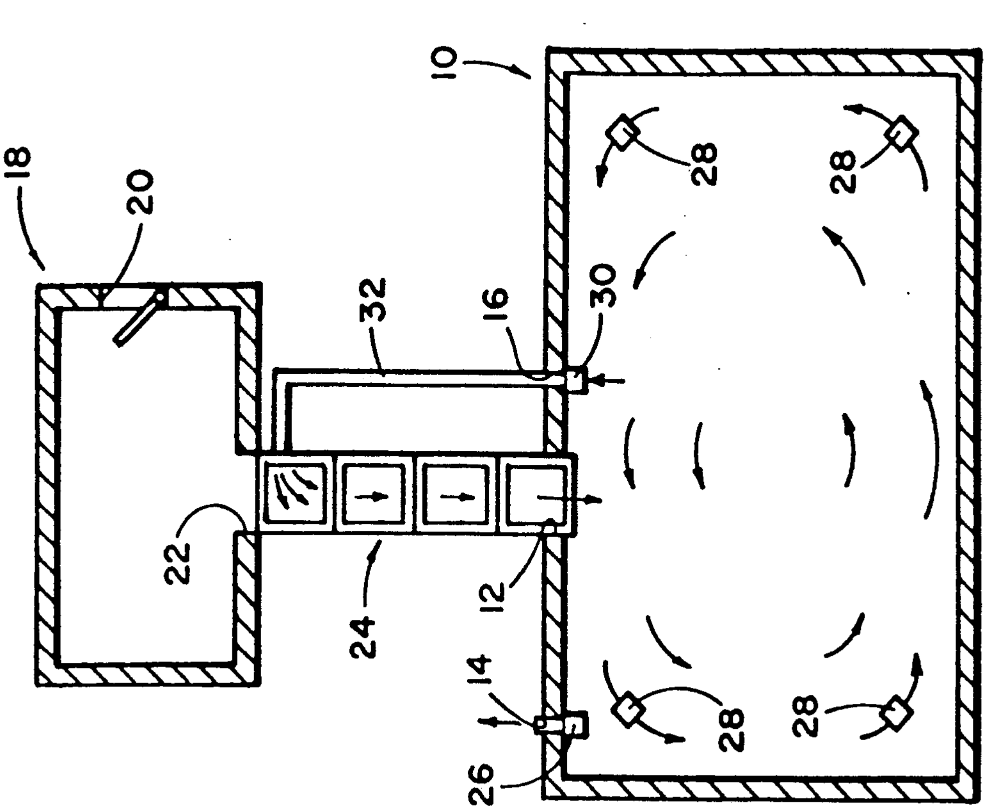
FIG. 1 is a plan view showing a contaminated room with a dressing room located adjacent thereto, a decontamination unit connecting the dressing room and the contaminated room and showing air flow paths for maintaining negative air pressure within the contaminated room and positive air pressure in the decontamination unit.

Referring to the drawings and particularly to FIG. 1, a contaminated room is generally indicated by the numeral 10. By "contaminated room" it is meant, a room, a portion of a building, or an entire building, that is, a space which is generally closed by walls and a ceiling or roof and which includes contamination materials, such as asbestos, which needs to be removed from the space. To remove the contamination, which will be hereinafter referred to as asbestos for purposes of simplicity, (it being understood that this term is used to represent any kind of contaminated material that must be removed from a closed space) care must be taken to insure that in the process asbestos fibers are not permitted to pass from the interior of the room 10 into the atmosphere since such would then constitute contamination of the atmosphere.

The contamination room 10 has a doorway or passageway 12 therein, a first air discharge opening 14 and a second air discharge opening 16. In addition, the contaminated room 10 has leakage air paths that are characteristic of any building construction, that is, air paths around windows, vents, doors, pipes, and so forth. These leakage air paths are not shown in FIG. 1 but are inherent and characteristic of substantially all building construction.

The first step in undertaking the removing of asbestos from the interior of contaminated room 10 is to provide, adjacent the contaminated room, a dressing room 18. The dressing room can be in the form of a mobile or portable facility or it can be a decontaminated room in a building complex. The function of dressing room 18 is to provide a facility where workmen can change clothes when entering or leaving or, at least, where street clothes can be taken on or off. The dressing room has an entry door 20 by which workmen enter or exit and a passage door 22 by which workmen pass when moving from the dressing room to the contaminated room 10 or vice versa.

Connecting the dressing room 18 with the contamination room 10 is a decontamination unit 24. The function of the decontamination unit is to provide for transition between dressing room 18 and contaminated room 10 and to provide air control so as to prevent contaminated air from passing from the contamination room 10 into the dressing room 18. The decontamination unit 24 will be described in greater detail subsequently.

Positioned within or adjacent to the contaminated room 10 is a filtered air pump 26 that moves air from within room 10 to the exterior thereof, that is, from within the room to the atmosphere. The filtered air pump 26 can be located either within or outside the room 10, but its function is to filter and pass air from within to the exterior of the room through the first air discharge opening 14. The function of the filtered air pump 26 is, at all times while work is being done within room 10, to maintain negative air pressure within the room. The step of maintaining negative air pressure within room 10 insures that all other passage of air between the room and the atmosphere is in the direction toward the room, that is, all leakage air passageways will experience flow of air into the room rather than out of the room to thereby insure that contaminated air will not inadvertently pass out of the room.

Positioned within the interior of room 10 are a plurality (four being shown) of filtered air pumps 28. These air pumps do not connect with passageways and function only to circulate air within the interior of room 10, while at the same time filtering contaminated particles from the air. Thus, the filtered air pumps 28 maintain circulation for improved temperature control and comfort of workmen, while at the same time serve to constantly reduce the level of air contamination within the room. Such filtered air pumps 28 are well-known and frequently employed in the industry and have filters which can be periodically removed and discarded.

Positioned in communication with the second air discharge opening 16 is another filtered air pump 30. Connecting the second discharge opening 16 with the interior of decontamination unit 24 is a conduit 32. Filtered air pump 30 moves air from the interior of room 10 through conduit 32 into the interior of decontamination unit 24 to thereby maintain a positive air pressure within the decontamination unit compared to the negative air pressure maintained within room 10. Since room 10 has negative air pressure relative to that of the decontamination unit, the flow of air through the decontamination unit 24 will be in the direction indicated by the arrows, that is, always in the direction toward the interior of room 10.

Figure 3:
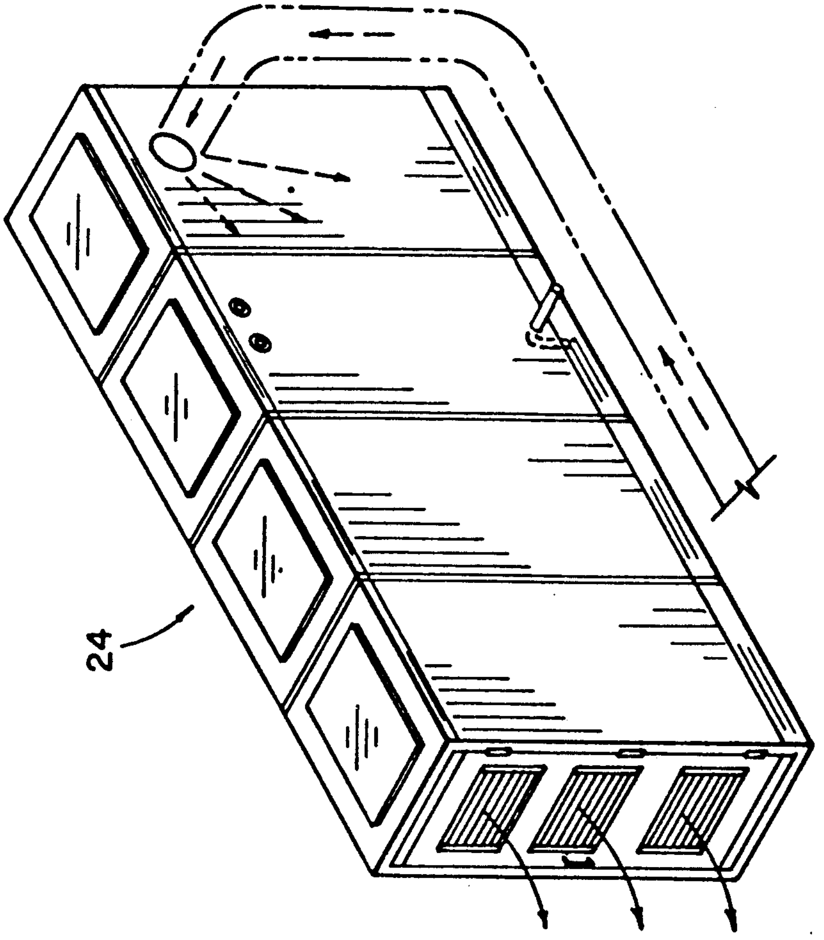
FIG. 3 is an isometric view of the decontamination unit formed from a series of separate cells that may be independently transported to the site where decontamination work is to be undertaken.
Figure 2:
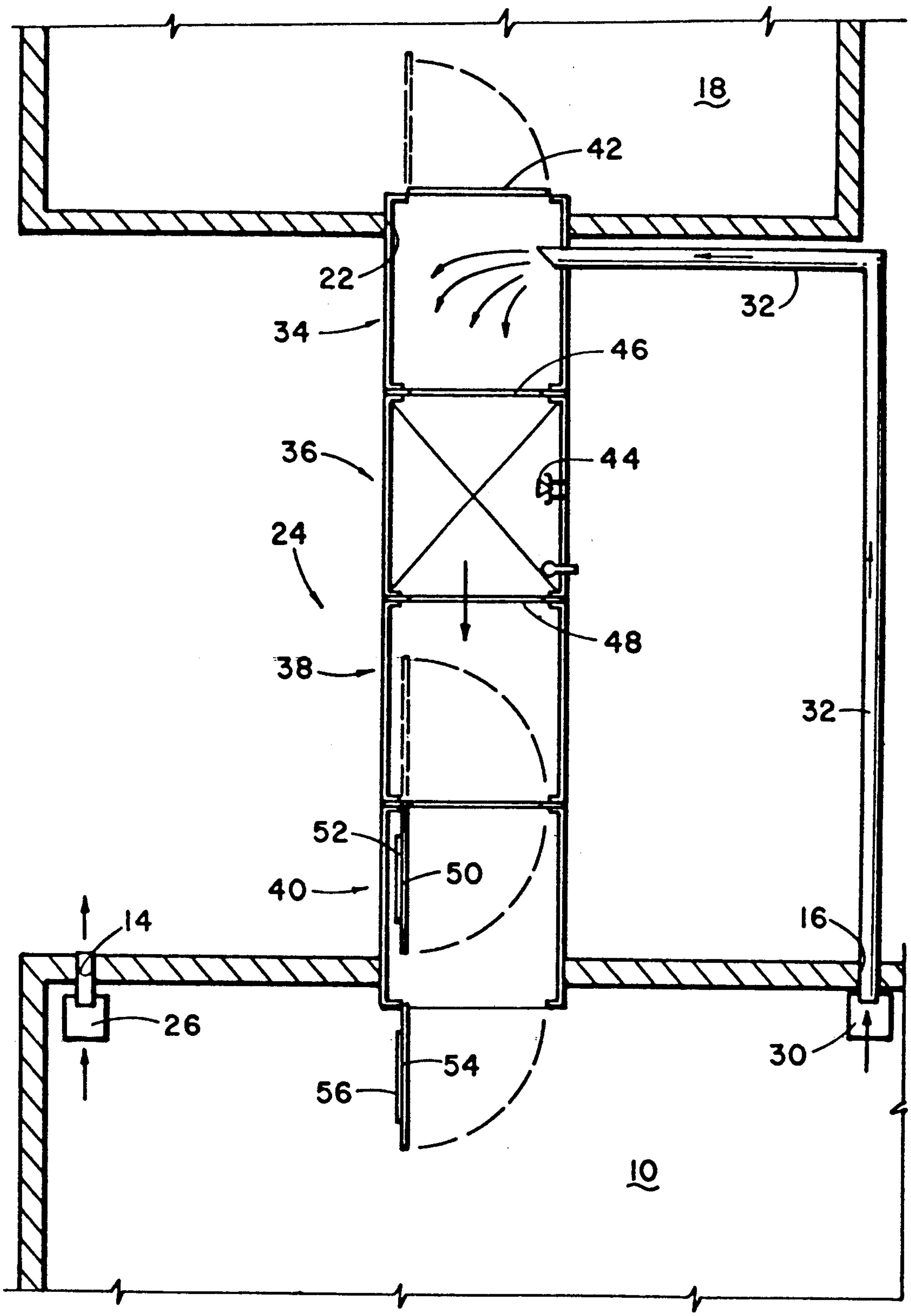
FIG. 2 is an enlarged partial plan view showing in greater detail a portion of the contaminated room, a portion of the dressing room and the decontamination unit therebetween and showing a conduit for passing filtered air from within the contaminated room into the decontamination unit.

As shown in FIGS. 2 and 3, the decontamination unit 24 is preferably formed by a series of units or cells, four such cells being shown, and identified by the numerals 34,36,38 and 40. The cells can be prefabricated and moved to the location, set up and connected to each other so that the same decontamination unit may be moved from job to job as required. Cell 34 has a solid door 42. The door 42 is preferably supported in a biased manner so as to remain closed at all times, except when opened by workmen to pass from or into dressing room 18.

Cell 36 preferably includes a shower 44 so that workmen, when leaving contaminated room 10, can stop in shower 44 to bathe away asbestos particles carried on their skin as a result of working in the contaminated room. Each entry into cell 36 is preferably closed with shower curtains 46 and 48, which permit air to pass through in the direction indicated by the arrow toward the contaminated room 10.

Cells 38 and 40 function as air lock rooms. A door 50 between cells 38 and 40 can swing in either direction. The door 50 has an anti-back flow damper 52 thereon so that when the door is closed, air can nevertheless flow in the direction toward room 10 but is prohibited from flowing in the opposite direction.

A door 54 closes the entry to cell 40, and it also has an anti-backflow damper 56 so that when the door is closed, air can flow from the decontamination unit 24 into room 10 but not in the reverse direction.

By the principles of this disclosure, air drawn into room 10 always flows only through leakage paths into the room, and the air flows out of room 10 only through the filtered air pump 26. The air which flows through the decontamination unit 24 does not enter from the atmosphere but is air supplied by filtered air pump 30 through conduit 32. Air is not drawn from the dressing room 18 into the contaminated room 10 nor does air pass from the decontamination unit into dressing room 18. Thus, by the principles of this disclosure, a system is provided for maintaining air movement for improving the environment within the contaminated room 10, while permitting workmen to enter and leave the room as necessary by passage through the decontamination unit 24.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A system for improving the work environment in a contaminated room while contaminated material is being removed therefrom, the contaminated room having a door therein through which workmen enter or exit and having a first and a second air discharge opening therein, comprising:

a dressing room adjacent said contaminated room providing an area in which workmen can prepare for work in the contaminated room or prepare for leaving work after working in the contaminated room, the dressing room having a door therein;

a decontamination unit connecting said dressing room door with said contaminated room door through which workmen pass when entering or exiting the contaminated room;

at least one filtered air pump means passing filtered air from within said contaminated room through said first air discharge opening to the exterior of said contaminated room to maintain negative air pressure within said contaminated room;

a conduit connecting said contaminated room second air discharge opening with said decontamination unit; and a filter air pump means for passing filtered air through said conduit into said decontamination unit to maintain positive air pressure within said decontamination unit whereby air flow is maintained from said decontamination unit into said contaminated room.

2. A system for improving the work environment in a contaminated room according to claim 1 including:

at least one filtered air pump within said contaminated room for filtering and circulating air within the room.

3. A system for improving the work environment in a contaminated room according to claim 1 wherein said decontamination unit includes a shower facility therein.

4. A system for improving the work environment in a contaminated room according to claim 1 wherein said decontamination unit includes a plurality of connected cells having a door between at least some of the cells through which workmen can pass.

5. A system for improving the work environment in a contaminated room according to claim 4 wherein one of said cells in said decontamination unit has a shower therein.

* * * * *